United States Patent [19]

Ofer et al.

[11] Patent Number: 5,822,513
[45] Date of Patent: Oct. 13, 1998

[54] METHOD AND APPARATUS FOR DETECTING STALE WRITE DATA

[75] Inventors: Erez Ofer, Brookline; Brian L. Garrett, Hopkinton, both of Mass.

[73] Assignee: EMC Corporation, Hopkinton, Mass.

[21] Appl. No.: 723,971

[22] Filed: Sep. 27, 1996

[51] Int. Cl.⁶ .................................................. G06F 11/00
[52] U.S. Cl. .............................. 395/183.18; 395/185.07; 395/183.08; 371/27.1
[58] Field of Search ..................... 395/185.01, 185.02, 395/185.06, 183.18, 183.08, 183.01, 185.07; 371/21.1, 21.2, 21.3, 27, 21.5, 21.6, 27.1, 27.5

[56] References Cited

U.S. PATENT DOCUMENTS

| | | | |
|---|---|---|---|
| 4,841,525 | 6/1989 | Lieske et al. | 371/21.3 |
| 5,185,744 | 2/1993 | Arimoto et al. | 371/21.3 |
| 5,222,066 | 6/1993 | Grula et al. | 371/21.3 |
| 5,274,648 | 12/1993 | Eikill et al. | 371/21.2 |
| 5,392,294 | 2/1995 | Bosch et al. | 371/21.2 |
| 5,471,482 | 11/1995 | Byers et al. | 371/21.2 |
| 5,477,492 | 12/1995 | Ohsaki et al. | 371/21.2 |
| 5,555,249 | 9/1996 | Hilley et al. | 395/183.18 |
| 5,621,738 | 4/1997 | Caywood et al. | 395/183.18 |
| 5,621,883 | 4/1997 | Thoulon et al. | 395/183.18 |

*Primary Examiner*—Joseph Palys
*Attorney, Agent, or Firm*—Leanne J. Fitzgerald, Esq.; John M. Gunther, Esq.

[57] ABSTRACT

A method and apparatus are provided for detecting stale write data bugs associated with storage systems. The detection is accomplished by choosing a data pattern signature for each block of a storage device to be tested. The data pattern signature is then stored in a write log table which provides an index as to the data pattern signature associated with each block. Then, the block is filled by writing, in a repeating fashion, the data pattern signature until all bytes of the block have been written. At a later time, the entire block is read from the storage device. Once read, each byte retrieved is compared against the value of the data pattern signature currently stored in the write log for that block. If a mismatch is detected, then the error is reported and stored in a error log so that the bug may be eliminated.

9 Claims, 4 Drawing Sheets

METHOD AND APPARATUS FOR DETECTING STALE WRITE DATA

BACKGROUND OF THE INVENTION

This invention relates generally to storage systems typically associated with computer systems and more particularly to providing a method for testing the operational integrity of a storage system.

As is known in the art computer systems generally include a central processing unit, a memory subsystem, and a storage subsystem. According to a networked or enterprise model of a computer system the storage subsystem associated with or in addition to a local computer system may include a large number of independent storage devices or disks housed in a single enclosure. This array of storage devices is typically connected to several computers over a network. Such a model allows for the centralization of data which is to be shared among many users and also allows a single point of maintenance for the storage functions associated with computer systems.

A storage system associated with a networked computer system will typically be a complex system including many individual storage elements such as magnetic disks housed in an enclosure. The disks may be arranged in any one of well known RAID configurations. A storage system employing a RAID configuration may include several controllers for controlling the transfer of data to and from the magnetic disks. The controllers used in such systems usually include a specialized central processing unit which is programmed to handle the data transfer tasks.

One of the tasks for which the specialized processor is responsible is the implementation of a caching algorithm associated with the data transfers to and from the disks (and ultimately to a host or network computer). Like most processors, the specialized processor used on the disk array controllers operates according to instructions (or microcode) loaded therein. The microcode is written by engineers and programmers and is designed to efficiently handle the data transfer tasks.

As mentioned above, the specialized processors associated with each controller are responsible for implementing the chosen caching algorithm which dictates when data is brought into and out of the cache and also when data is destaged or written to the disks from the cache. Since the caching algorithms are dictated by the microcode loaded in the specialized processor, programming errors may lead to data corruption errors during operation of the disk storage system. One type of error which may occur as a result of microcode errors is a stale write data bug. The stale write data bug is one that occurs with an input/output (I/O) sequence which attempts to write different successive blocks of data to the same location on a disk device followed by a read of that location which does not yield that last written data. This type of data corruption problem is subtle and is generally difficult to detect. If gone undetected, this type of bug could lead to application programs, utilizing the storage device, to return unexpected data. This occurs since the data may be wrong in the cache but later correct on the storage device.

In order to ensure that the microcode performs without error, tests are typically performed which attempt to expose any bugs which may exist in the microcode. These tests are generally performed by loading the microcode into the specialized controller and performing a series of disk access operations using the specialized controller having the microcode loaded therein. The type and sequence of disk access operation generally define the test being performed. Former testing approaches typically identify each block of a storage device with a device and block number in an attempt to ensure that the correct block is read. However, this method often does not create and re-write I/O patterns which cause the stale write data bug described above. Additionally, most test approaches use only one data pattern algorithm for all blocks on a storage device within a single test run. Thus the former methods do not address the problem of and do not detect the stale write data bug.

SUMMARY OF THE INVENTION

According to one aspect of the present invention, a method of detecting stale write data bugs in a data storage device includes the steps of determining a data pattern signature to be used for writing data to a particular block of storage area on a storage device and providing a write log storage area having an entry for storing the data signature pattern corresponding to data stored in a particular block of storage area. During a test procedure, a chosen data pattern signature is stored in the write log area. Next, the data pattern signature is used to indicate what data will be used to fill the corresponding block. At some later time, the entire block is read from the storage device. After reading the block, the data retrieved is compared against the corresponding data pattern signature stored in the write log. If there is a mismatch, it is reported and the results of the compare are stored in a log file. With such a method, stale write data bugs may be detected and corrected leading to a storage system having a higher level of integrity.

In accordance with another aspect of the present invention, an apparatus for detecting stale write data bugs associated with data written to a storage device includes a data pattern signature generator and a write log having a plurality of entries for storing a plurality of data pattern signatures, each of the entries corresponds to a block of storage on the storage device. The apparatus further includes a write processor for writing a data pattern signature to the write log and for filling, using the data pattern signature, a block of storage on the storage device. The data pattern signature may be a single byte while the block of storage includes a plurality of bytes. The filling operation is thus performed by using the data pattern signature to generate a block of data which is written to the storage device. In addition to the write processor, a check processor is provided which reads and compares a data pattern signature read from said write log to corresponding bytes of data from a block corresponding to the read data pattern signature. An error log is also provided for receiving from the check processor a message indicating that the compare of the data pattern signature and the data from the corresponding block did not result in a match. With such an arrangement, a storage system may be checked to detect and eliminate stale write data bugs thereby resulting in a storage system having a high level of integrity.

BRIEF DESCRIPTION OF THE DRAWINGS

The above and further advantages of the present invention may be better understood by referring to the following description taken in conjunction with the accompanying drawings in which.

DETAILED DESCRIPTION OF THE PREFERRED EMBODIMENT

Figure 1:
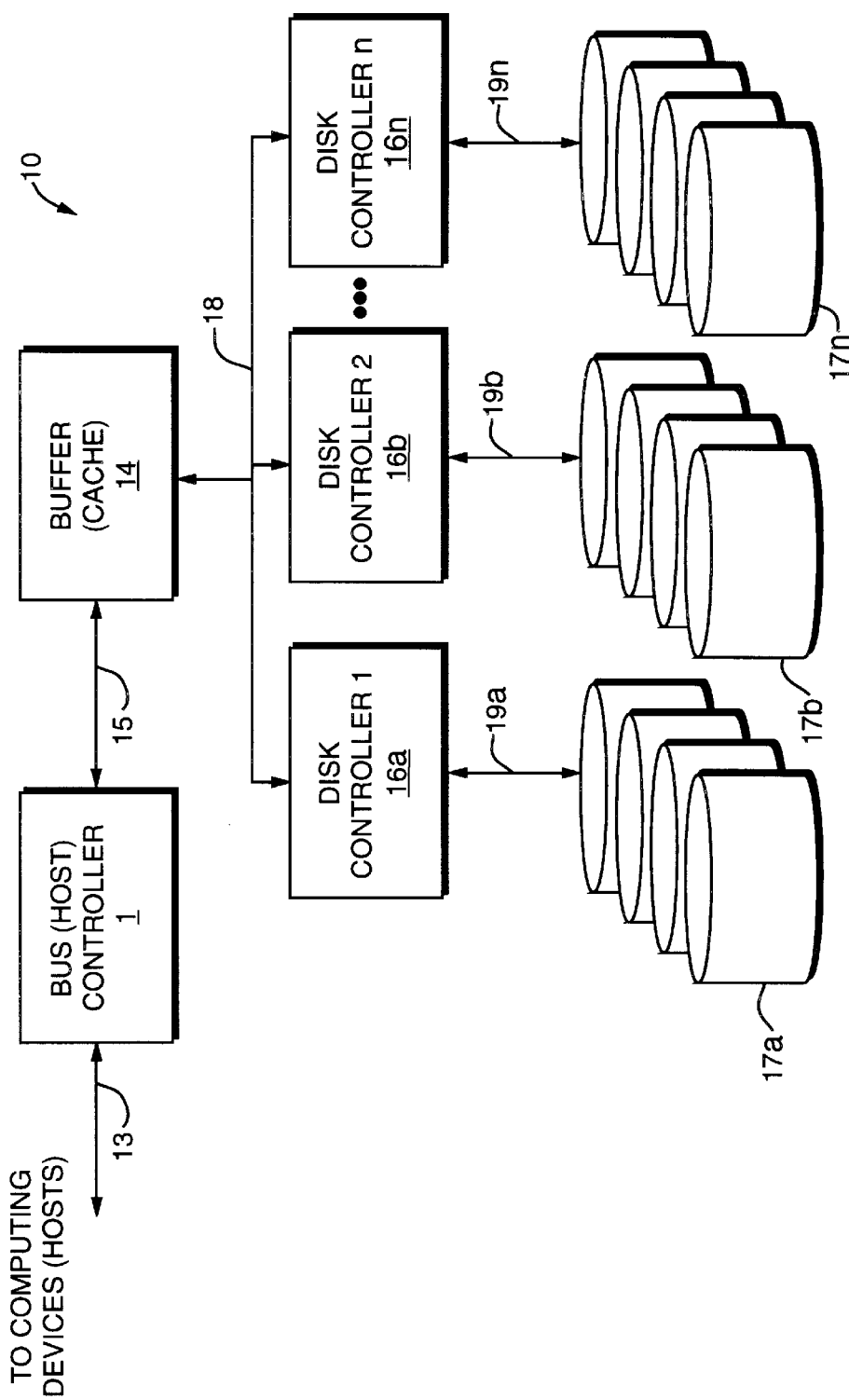
FIG. 1 is a block diagram representation of a storage system.

Referring now to FIG. 1, storage system 10 is shown to include inter alia, bus controller 12 coupled via bus 15 to buffer (or cache) 14 which is in turn coupled to disk controllers 16a–16n via bus 18. Each disk controller 16a–16n is further coupled to an array of disks 17a–7n respectively. Here, each array is shown to include four magnetic disks. However, fewer disks or additional disks may be included in each array. The disk controllers include microprocessors (not shown) which, when operating under the control of an input program (microcode), control the transfer of data to and from the disks associated with the controller.

During operation of the storage device, a request will come from a host device via bus 13 to bus controller 12 for an access to one of the disk arrays. The bus controller 12 will then generate the appropriate request (read or write) to the controller associated with the target disks of the access request. If the request is a write request, the bus controller will typically write the data associated with the access request to the cache 14. At some later time, in accordance with the caching protocol being employed by the storage system, the data will be destaged (written) to the disks which are the target of the write request.

The cache 14 of storage system 10 is typically has storage capacity which is many times smaller than the total storage capacity of the disk arrays 17a–17n. As a result, the same location in the cache may be used to temporarily store data for many different locations on the disks in the disk arrays. Thus, over time, writes to several different disks may result in many writes to the same location in cache. At some point in time data in the cache may need to be destaged (written) to the disk. The particular circumstances under which data is destaged to disk is typically controlled by the disk controllers 16. Since the caching scheme used in updating the cache and destaging data to disk is controlled by the microcode (not shown) programmed into the processors of the various controllers 16, a problem may arise if the microcode contains a bug which doesn't provide the correct updating sequence.

The above described bug may not present itself during routine testing of the storage system since the condition under which the bug causes an error is not a common one. However the consequences of allowing a storage system with such a bug to ship to a customer may be dire. The results of undetected bug, as described above, is the unrecoverable loss of data to an application expecting the data.

According to the present invention, a method and apparatus are provided which exercise a storage system in a manner which allows for the detection of microcode bugs which yield stale write data errors. To understand the workings of the invention it is first helpful to provide a brief description of the breakdown or organization of data stored on disk devices used in the preferred embodiment of the present invention. It should be understood that although the preferred embodiment is described in the context of a storage system employing magnetic disks, the invention is generally applicable to any memory or storage system employing a cache.

Figure 2:
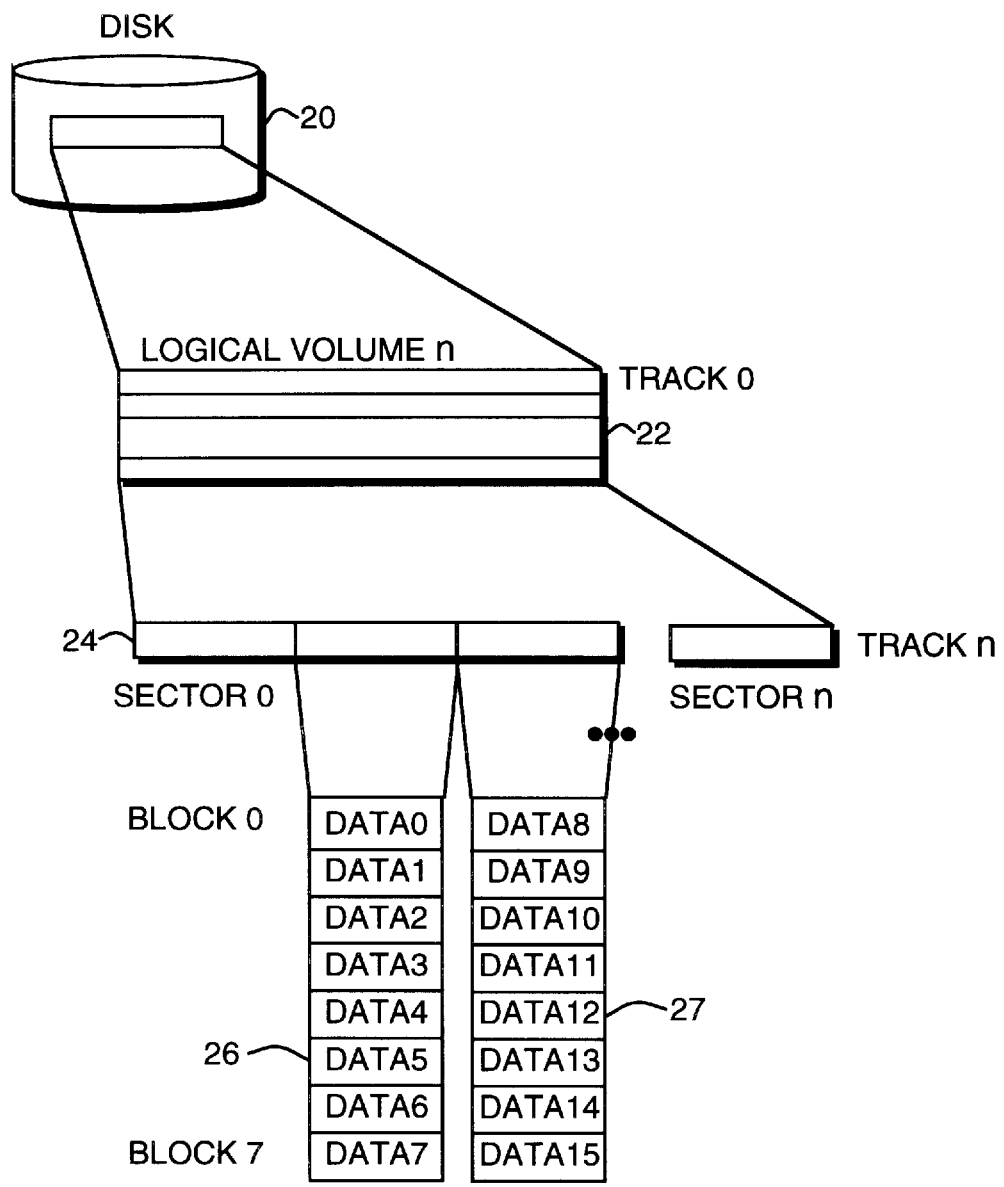
FIG. 2 is a diagrammatic representation of the segmentation of data on one of the disks of the disk storage system of FIG. 1.

Referring now to FIG. 2, an exemplary one of the disks 20 from arrays 17a–17n is shown to include a logical volume 22 which is further segregated in to a plurality of tracks 24. One of the tracks 24 (track n) is shown to be further segregated into a plurality of sectors, sector 0 through sector n. Two sectors 26 and 27 of track 24 are shown to be further segregated into a plurality of blocks. Here each sector 26, 27 includes eight blocks. Each block is then typically broken down into a plurality of bytes (not shown). In the preferred embodiment the number of bytes per block is 512. Data is typically written and read to the disk in block increments. That is, the smallest amount of data typically read from or written to a disk is one block (or 512 bytes).

Figure 3:
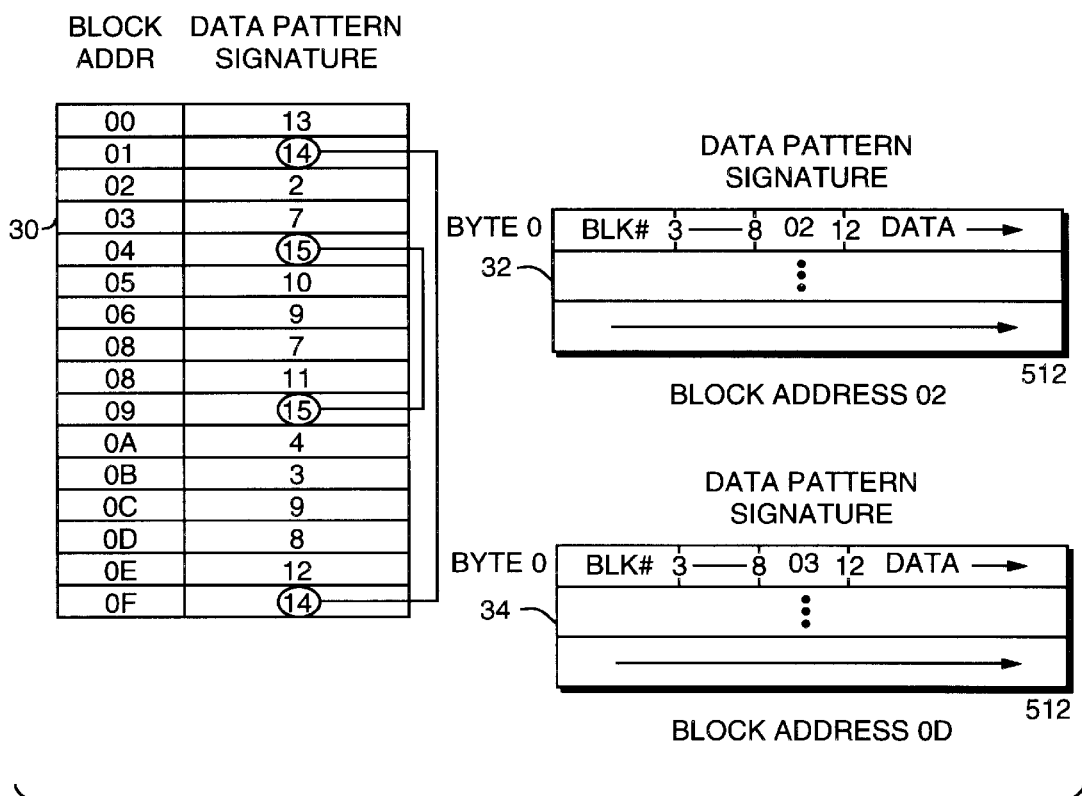
FIG. 3 is a diagrammatic representation of a write log file and two blocks of one of the disks of the storage system of FIG. 1.

Referring now to FIG. 3, and according to the present invention, write log 30 is provided which includes a two dimensional storage array. According to the preferred embodiment, there may be a write log associated with each disk 20 and may be stored in a header or beginning portion thereof Here the write log file 30 is shown to include sixteen entries and is for illustration purposes only. In the preferred embodiment, the write log file includes one entry per block of storage on the associated disk. Each entry in the write log file may include an address of one of the blocks and an associated data pattern signature. The address is an index into the disk device and may be a full address or may be in the form of an offset if the base address of the first block is known. As configured for the testing procedure of the preferred embodiment, the data pattern signature is one byte in length and is used as described below to verify that a disk controller 16 is performing the programmed write caching algorithm as expected.

The data pattern signature is used to indicate, to the testing procedure process which data pattern to use in filling the associated block. In the preferred embodiment, there are fifteen data pattern signatures as shown in the table below. Note that the table includes sixteen (i.e. data pattern signature number 15) entries, but that the sixteenth data pattern signature indicates to the test process to choose randomly choose one of the fifteen possible entries. For example, and using TABLE 1 below, if the test process were to use data pattern signature 3, 0x99999999's will be written to the associated block(s). If a data pattern signature 8 is chosen, then the

TABLE 1

| | |
|---|---|
| 0 | 0xFFFFFFFF |
| 1 | 0x55555555 |
| 2 | 0x99999999 |
| 3 | 0xaaaaaaaa |
| 4 | 0xaa55aa55 |
| 5 | 0x00000000 |
| 6 | Logical Block Address |
| 7 | Logical Block Address +1 |
| 8 | Logical Block Address +4 |
| 9 | Logical Block Address +100 |
| 10 | Inverse(Logical Block Address) |
| 11 | Inverse(Logical Block Address +1) |
| 12 | Inverse(Logical Block Address +4) |
| 13 | Inverse(Logical Block Address +100) |
| 14 | Random Data (seed stored) |
| 15 | Random Selection of 1–14 above | value 4 will be added to the current logical block address and then written to the first longword of the block of the block data field as shown block 34 of FIG. 3. The second longword of the block data field will be written with the value written in the first block+1. This procedure will repeat until the entire block data field is correctly loaded.

Still referring to FIG. 3, two blocks 32, 34 of disk 20 (FIG. 2) are each shown to include 512 bytes of storage. The figure which here shows each as including 512 bytes is done only for discussion purposes and should not be seen as a limitation of the present invention. As shown in the figure, the example block 32 is a block having a starting address of 02. During the testing procedure, an entry will be made in the write log file 30 at the location corresponding to address 02 and will include the write data pattern to be used to fill block 32 (here, data pattern signature 2 meaning fill the block with 0x99999999). At the same general time, each byte of block 32 will be will be written with the data corresponding to the pattern signature being written to the write log file at entry 02. Furthermore, the data pattern signature will also be stored at the beginning of the associated block, here stored in bytes 08–12. According to the present invention, during the test procedure, at some time after the data pattern signature has been written to block 32, the block will be read from the disk device. Additionally, the data pattern signature at location 02 of write log file 30 will be read. Thereafter, the each byte of the read block will be compared to the expected pattern as defined by the data pattern signature. As seen in the example for block 32, the data pattern signature byte contains the value corresponding to the value stored in the write log file at location 02. Thus, for this block, no error would need to be reported.

Still referring to FIG. 3, block 34 is one of the blocks of disk 20 (FIG. 2) and has a block address of OD. As described above, during the testing procedure, a data pattern signature will be determined for block 34 and will be written in the corresponding entry in the write log file 30. Here the data pattern signature for block 34 is, as shown at location OD, 08 (i.e. fill the data bytes as described in the example above). As above, at the same general time, the corresponding pattern will also be written to each byte of block 34 along with the data pattern signature being written to bytes 08–12. Some time later the contents of block 34 will be read. In addition the data pattern signature from location OD of the write log file 30 will also be read and a comparison will done between the data pattern signature from the write log file and the data pattern signature from block 34. Note here that the data pattern signature stored in block 34 does not match the expected data pattern signature from write log file 30 and thus a write error will be reported for block 34. The error log will include the block address, the expected data pattern signature, the actual data pattern signature, and the full block of data. With this information an analysis may be performed to determine the cause of the stale write data error.

The above example was shown having only a single byte being of different value than the expected data pattern signature and was provided for illustration purposes only. In reality, many bytes or all bytes of the block may different than the expected data pattern signature since the error will typically result from an improper update of data from the cache to the disk device.

Figure 4A:
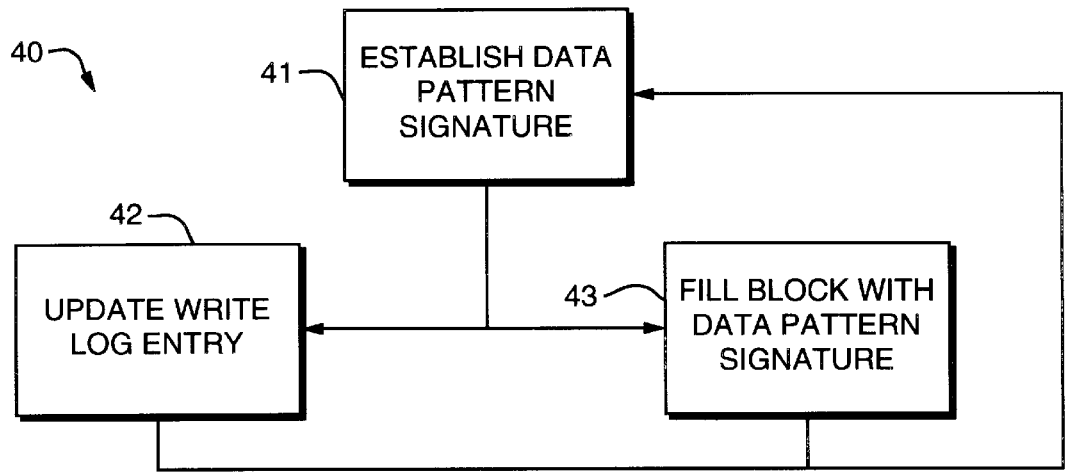
FIG. 4a is a flow diagram showing the write logging portion of the stale write data detection process.
Figure 4B:
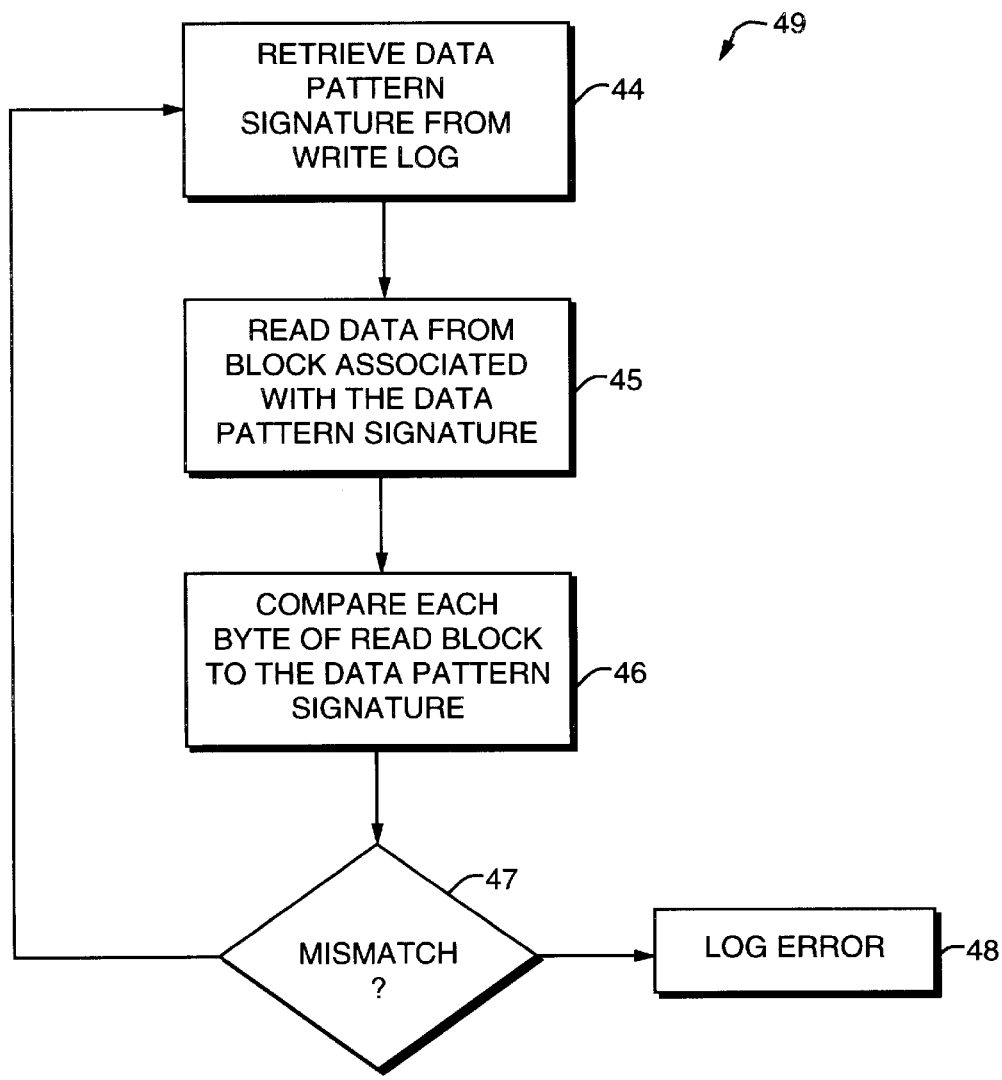
FIG. 4b is a flow diagram showing the read/verify portion of the stale write data detection process.

Referring now to FIG. 4, a flowchart 40 depicts the write logging process for detecting stale write data bugs according to the present invention. As shown, at step 41 a data pattern signature is determined for a particular block. Substantially simultaneously, at steps 42 and 43, the data pattern signature is entered into the write log file 30 and written to the associate block (32 or 34) as described above. The steps 41–43 may occur in a loop with the same blocks being overwritten several times. Sometime thereafter a read verify procedure will be performed according to flowchart 49. During the verify procedure, starting at step 44, the data pattern signature of a block will be retrieved from the write log file 30. At step 45, the data block corresponding to the data pattern signature as indicated in the write log file 30 will also be read. During the read of the block being verified, at step 46, each byte of data read from the block is compared against the data pattern associated with the data pattern signature read from the write log file. If there is a mismatch between a particular byte and the expected pattern, as detected in step 47, then a stale write data error will be reported in to log file in step 48. The verify procedure may then move on to the next block, returning to step 44 and proceeding through to step 48 until the entire disk has been analyze and all stale write data errors reported.

It can be seen then that by providing a write log file for each storage device under test, filling blocks with predetermined patterns which are "remembered", and comparing the data in the blocks with the remembered values at some later time, stale write data errors can be detected and reported. Thus a storage system tested with the above described process and apparatus has a higher level of integrity than those prior art systems not tested in such a manner.

Having described a preferred embodiment of the present invention it will now become apparent to those of skill in the art that other embodiments incorporating its concepts may be provided. It is felt therefore, that this invention should not be limited to the disclosed embodiment but rather should be limited only by the spirit and scope of the impended claims.

What is claimed is:

1. A method for detecting stale write data bugs in a data storage system comprising the steps of:

determining data pattern signatures to be used for writing data to particular blocks of storage area on a storage device of said storage system;

providing a write log storage area, said write log storage area having a plurality of entries for storing a plurality of data pattern signatures, each of said entries corresponding to ones of said blocks of storage area;

at a first time $t_1$,
storing in entries of said write log area, said data pattern signatures;
using said data pattern signatures, filling corresponding ones of said blocks of storage with write data;

at a second time $t_2$,
storing in entries of said write log area said data pattern signatures;
using said data pattern signatures, filling corresponding ones of said blocks of storage with write data;

at a third time $t_3$,
reading data stored in one of said blocks of storage area;
comparing said data read from said one block of storage area to expected data corresponding to one of said data pattern signatures stored in said write log at time $t_2$; and storing in a log file the results of said compare step if a mismatch is found between said one of data pattern signatures stored at time $t_2$ and said data read from said one storage block.

2. The method as in claim 1 wherein said storage device includes a plurality of blocks of storage area and said write log includes a corresponding plurality of entries.

3. The method as in claim 1 wherein said one of data pattern signatures is a single byte of data and said block of storage area includes storage for a plurality of bytes of data and wherein said filling step includes the step of writing data corresponding to said one of data pattern signatures to each of said plurality of one block of storage area.

4. The method as in claim 3 wherein comparing step includes comparing each byte of data read from said one block of storage area to said expected data corresponding to one of said data pattern signature and where said mismatch is found when any one of said read bytes of data is not the same as said data signature pattern.

5. An apparatus for detecting stale write data bugs associated with data written to a storage device comprising:

a data pattern signature generator;

a write log having a plurality of entries for storing a plurality of data pattern signatures, each of said entries corresponding to a block of storage on said storage device;

a write processor for writing, at a first time $t_1$, a data pattern signature to said write log and for filling, using said data pattern signature, a block of storage on said storage device and for writing, at a second time $t_2$, another data pattern signature to said write log and for filling, using said other data pattern signature, a block of storage on said storage device;

a check processor for reading at time $t_3$ a data pattern signature read from said write log and for reading data from a block corresponding to said read data pattern signature and for comparing said data read from said block to expected data corresponding to said data pattern signature; and an error log for receiving from said check processor a message indicating that said compare of said read data pattern signature and said read data from said corresponding block did not result in a match.

6. The apparatus as in claim 5 wherein said data pattern signature includes a single byte of data and wherein said block of storage includes storage for a plurality of bytes of data and wherein said write processor fills said block of storage by writing data corresponding to said data pattern signature to each of said plurality of bytes of said block of storage.

7. The apparatus as in claim 6 wherein said check processor is operative to compare each of said plurality of bytes read from said block of storage to said data corresponding to said data pattern signature read from said write log.

8. The apparatus of claim 5 wherein said write processor and said check processor are integral to a programmed computer which is coupled to said storage device.

9. The apparatus as in claim 5 wherein said write log is a data structure residing on said storage device with each of said entries corresponding to data blocks of said storage device.

* * * * *